(12) United States Patent
Eick et al.

(10) Patent No.: US 9,846,248 B2
(45) Date of Patent: Dec. 19, 2017

(54) SEISMIC DATA ACQUISITION USING DESIGNED NON-UNIFORM RECEIVER SPACING

(75) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 1363 days.

(21) Appl. No.: 13/156,104

(22) Filed: Jun. 8, 2011

(65) Prior Publication Data

US 2011/0305113 A1 Dec. 15, 2011

Related U.S. Application Data

(60) Provisional application No. 61/353,089, filed on Jun. 9, 2010, provisional application No. 61/353,095, filed on Jun. 9, 2010.

(51) Int. Cl.
*G01V 1/20* (2006.01)
*G01V 1/38* (2006.01)

(52) U.S. Cl.
CPC ................. *G01V 1/3826* (2013.01)

(58) Field of Classification Search
CPC ....... G01V 1/13; G01V 1/3826; G01V 1/3808
USPC .............. 367/37–38, 56–58; 181/5, 112, 122
See application file for complete search history.

(56) References Cited

U.S. PATENT DOCUMENTS

| | | | |
|---|---|---|---|
| 2,096,363 A * | 10/1937 | Methudy | 431/192 |
| 2,906,363 A | 9/1959 | Clay, Jr. | |
| 3,747,055 A | 7/1973 | Greene, Jr. | |
| 3,747,056 A * | 7/1973 | Treybig et al. | 367/62 |
| 3,877,033 A * | 4/1975 | Unz | 343/844 |
| 4,330,873 A * | 5/1982 | Peterson | 367/60 |
| 4,559,605 A | 12/1985 | Norsworthy | |
| 4,596,005 A * | 6/1986 | Frasier | 367/38 |
| 4,597,066 A * | 6/1986 | Frasier | 367/38 |
| 5,092,423 A | 3/1992 | Petermann | |
| 5,168,472 A | 12/1992 | Lockwood | |
| 5,517,463 A | 5/1996 | Hornbostel et al. | |
| 6,493,636 B1 | 12/2002 | Dekok | |
| 7,408,836 B2 | 8/2008 | Muyzert et al. | |
| 7,646,671 B2 | 1/2010 | Pan et al. | |
| 2009/0323472 A1 | 12/2009 | Howe | |
| 2010/0002536 A1 | 1/2010 | Brewer et al. | |
| 2010/0103772 A1 | 4/2010 | Eick et al. | |
| 2011/0019502 A1 | 1/2011 | Eick et al. | |

(Continued)

OTHER PUBLICATIONS

PCT/US2011/039635 PCT International Search Report (PCT/ISA/210) dated Oct. 25, 2011.

*Primary Examiner* — Luke D Ratcliffe
*Assistant Examiner* — Amie M Ndure
(74) *Attorney, Agent, or Firm* — ConocoPhillips Company

(57) ABSTRACT

The invention relates to an arrangement for seismic acquisition the spacing between each adjacent pairs of receiver and sources lines is not all the same. Some receiver and/or source lines and/or receiver and/or source spacings are larger and some are smaller to provide a higher quality wavefield reconstruction when covering a larger total area or for a similar total area of seismic data acquisition while providing a wavefield that is optimally sampled by the receivers and sources so that the wavefield reconstruction is suitable for subsurface imaging needs.

17 Claims, 11 Drawing Sheets

(56) References Cited

U.S. PATENT DOCUMENTS

2011/0305106 A1 12/2011 Eick et al.
2011/0305107 A1 12/2011 Eick et al.

\* cited by examiner

SEISMIC DATA ACQUISITION USING DESIGNED NON-UNIFORM RECEIVER SPACING

CROSS-REFERENCE TO RELATED APPLICATIONS

This application is a non-provisional application which claims benefit under 35 USC §119(e) to U.S. Provisional Application Ser. No. 61/353,089 filed Jun. 9, 2010, entitled "Marine Seismic Data Acquisition Using Designed Non-Uniform Streamer Spacing," and to U.S. Provisional Application Ser. No. 61/353,095 filed Jun. 9, 2010, entitled "Seismic Data Acquisition Using Designed Non-Uniform Receiver Spacing" which are both incorporated herein in their entirety.

STATEMENT REGARDING FEDERALLY SPONSORED RESEARCH OR DEVELOPMENT

None.

FIELD OF THE INVENTION

This invention relates to seismic data acquisition of geologic structures in the earth and processing the data that is useful in interpreting the geologic structures.

BACKGROUND OF THE INVENTION

Seismic data is acquired to investigate and map the structures and character of geological formations under the earth. Seismic data is typically gathered by laying out seismic receivers (e.g., geophones or similar sensors) in a survey area and directing one or more seismic sources such as vibrator trucks to move from shot point to shot point and direct seismic energy into the ground. As the seismic sources direct seismic energy into the earth where they are reflected and/or refracted by interfaces between subsurface geological formations the seismic receivers sense the resulting reflected and/or refracted energy, thereby acquiring seismic data that provides information about the geological formations under the ground. Basically a seismic source emits a wavefield that propagates down through the earth and is reflected and/or refracted by interfaces between subsurface geological formations then propagates back to the surface where the receivers detect and discretely sample the returning, ascending or upcoming wavefield.

Typically, thousands of discrete seismic receivers are used to gather seismic data. The seismic receivers are generally laid out in lines that are substantially parallel and laterally spaced at equal distances and uniformly spaced down the line. In this configuration, uniform coverage of the subsurface is achieved. It is conventional that receiver spacing along the lines is closer than the spacing between the lines and that, therefore, the wavefield detected by the sensors is less well sampled in the lateral direction (perpendicular to the receiver lines) in most seismic surveys. The normal ratio of the station spacing to the line spacing runs between 2 and 30 to 1. This means that the spacing of the receivers along the line is between half and one thirtieth the spacing between parallel receiver lines. This is normally due to the costs and expense of adding additional receiver lines that can dramatically increase the expense of the survey to achieve a better sampling of the returning, ascending or upcoming wavefield.

SUMMARY OF THE INVENTION

The invention more particularly includes a method of acquiring seismic data including deploying receivers in a survey area where each receiver is laterally spaced from one another in two horizontal directions wherein the lateral spacing in at least one horizontal direction is deliberately non-uniform and wherein the spacing between any two seismic receivers in the deliberately non-uniform direction varies by a distance of at least five percent between the largest spacing and smallest spacing. The method further includes directing seismic energy into the ground and recording reflected and/or refracted seismic data with the deployed seismic receivers, recovering the measured data from the deployed seismic receivers, and reconstructing the wavefield from the recovered data.

The invention also relates to a method of acquiring seismic data including deploying receivers in a survey area and identifying seismic source points within the survey area where each source point is laterally spaced from one another in two horizontal directions wherein the lateral spacing in at least one horizontal direction is deliberately non-uniform and wherein the spacing between any two seismic source points in the deliberately non-uniform direction varies by a distance of at least five percent between the largest spacing and smallest spacing. The method further includes directing seismic energy into the ground at the source points and recording reflected and/or refracted seismic data with the deployed seismic receivers, recovering the measured data from the deployed seismic receivers, and reconstructing the wavefield from the recovered data.

A particular preferred embodiment of the present invention relates to a method of acquiring seismic data including deploying receivers in a survey area where each receiver is laterally spaced from one another in two horizontal directions and identifying source points wherein each source point is laterally spaced from one another wherein the lateral spacing for each of the source points and for each of the receivers is deliberately non-uniform in at least one horizontal direction and wherein the horizontal spacing between any two seismic receivers in the deliberately non-uniform direction varies by a distance of at least five percent between the largest spacing and smallest spacing and further wherein the horizontal spacing between any two seismic source points in the deliberately non-uniform direction varies by a distance of at least five percent between the largest spacing and smallest spacing. The method further includes directing seismic energy into the ground from the source points and recording reflected and/or refracted seismic data with the deployed seismic receivers, recovering the measured data from the deployed seismic receivers, and reconstructing the wavefield from the recovered data.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
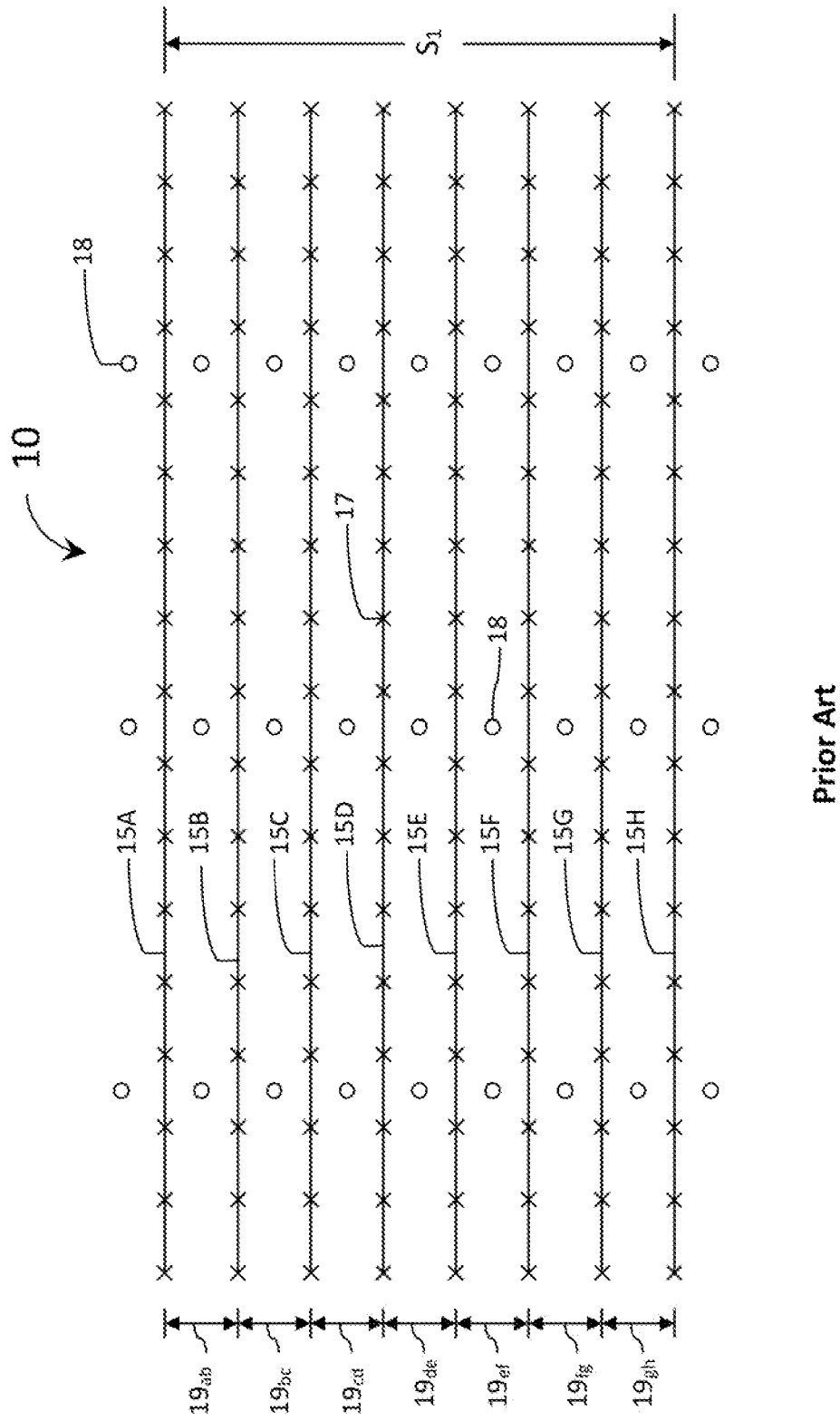
FIG. 1 is schematic top view of a portion of a seismic survey area showing a conventional arrangement of lines of seismic receivers with shot points.

Turning now to the preferred arrangement for the present invention, reference is made to the drawings to enable a more clear understanding of the invention. However, it is to be understood that the inventive features and concept may be manifested in other arrangements and that the scope of the invention is not limited to the embodiments described or illustrated. The scope of the invention is intended only to be limited by the scope of the claims that follow.

An exemplary conventional seismic data acquisition system is indicated by the arrow $10$ in FIG. $1$. The seismic data acquisition system $10$ comprises lines of receivers where eight such lines are shown and labeled $15A$, $15B$, $15C$, $15D$, $15E$, $15F$, $15G$ and $15H$. The receiver lines are arranged substantially parallel to one another and are commonly spaced a common and uniform distance apart. Along each receiver line are a number of generally evenly spaced receivers $17$, indicated by "x's". Also shown with small circles are shot points $18$ at which the seismic sources would generate and direct seismic energy into the ground. As arranged, the total system width of the system $10$ is $S_1$. The width-wise or lateral receiver line spacing between each adjacent pair of receiver lines is one seventh of $S_1$ and indicated as $19_{ab}$, $19_{bc}$, $19_{cd}$, $19_{de}$, $19_{ef}$, $19_{fg}$ and $19_{gh}$. In FIG. $1$, the receiver line spacing is such that nominally:

$19_{ab}=19_{bc}=19_{cd}=19_{de}=19_{ef}=19_{fg}=19_{gh}$.

In accordance with the present invention, it has been found that even or equal receiver line spacing may not be most optimal for acquiring seismic data. Noise in the data set may be most readily identified by even spacing and therefore fairly easily filtered or cancelled in post acquisition processing. But highly non-uniform or irregular spacing may actually provide better results in general. Additionally it has been found that the wavefield sensed in the lateral dimension (perpendicular to the receiver lines) by the receivers can be better and more accurately reconstructed if the receivers are spaced in a highly non-uniform or irregular spacing.

The reason for this is the method of wavefield sampling. A uniform grid or series of lines is much like a tree farm with trees neatly laid out in rows with a common, but close spacing of each tree within a row. The gaps between the trees represent gaps in seismic data that are literally large enough to drive a tractor through it. We don't know what is in the gaps and since they extend so far, there may be something fairly large. However, where the trees are lined up, the seismic data is oversampled as a recorder may actually be turned off and the two adjacent receivers will almost certainly provide sufficient data to accurately predict what the silent recorder would have captured. What should be disturbing is that the gaps are not just between two rows, but there are gaps running at 45 degree angles and 90 degree angles to the rows. Consider the views within Arlington National Cemetery where one is seeing all of the headstones that are perfectly aligned. Many headstones are somewhat hidden by the perfect alignment in quite a few orientations. This arrangement of headstones is good for demonstrating military precision and honoring fallen soldiers, but not as good for getting as much information about the geologic subsurface with the receivers available. While a random arrangement of receivers or sources is not desired, the point of a desired non-uniform arrangement may be visualized while standing in the middle of a dense forest where one has the impression of seeing an impenetrable array of trees. From any location, there are enough trees in view to be seen in a composite as an impenetrable forest. In a tree farm that may actually have more trees than the forest allows long views that are wide enough for tractors to easily drive. The rows of trees make the hidden trees seem redundant.

The critical question is how variable can we space the lines and stations and still recover our wavefield accurately. With knowledge of the likely complexity of the subsurface, synthetic surveys may be constructed and run on computers using varying arrays of receivers and sources. Using the data acquired by the synthetic survey, a wavefield reconstruction is created and compared to the underlying model. A variety of such tests will provide guidance to designing the various spacings in the actual survey. Clearly, a sparser survey is a less expensive survey and if accuracy can be obtained at lower cost, then a sparser survey will be undertaken that will provide the accuracy or precision needed.

Essentially, geophysicists are able to process and interpret seismic data to map the various interfaces between formations based on individual data points established by the time delay of the signal returned from the formation. The data actually forms a large plurality of interface points. The points may be seen to form a nearly continuous line along each of the interfaces in the direction of the vessel travel. Closely spaced "lines" of receivers provides higher three dimensional definition, but at considerably higher cost. Simply put, it takes a certain amount of time to deploy a line of seismic receivers and recover it from the field. Therefore, close lateral spacing of receiver lines means more labor cost and time performing the survey. While it would be preferred to properly sample the wavefield containing the echo returns with close spacing of lines and receivers, the costs associated with such a proper survey can be very costly to cost prohibitive.

Currently, geoscientists interpolate the shape of the geological interfaces in the gaps between points by using the data received by seismic receivers that are close to the gaps in question. Most interpolation algorithms are simple mathematical processes, such as basic averaging of the nearby data. With the missing information supplied by the interpolation, the data is provided to seismic processors to create an image of the geological subsurface. However, according to the present invention, it is better to reconstruct the entire wavefield in one realization. Wavefield reconstruction involves statistical linear regression analysis where a model wavefield is created from prior knowledge of the geological subsurface and is iteratively refined based on actual measured data from the seismic survey. Through the regression analysis, the L0 and L1 norms are calculated for each comparison between the model wavefield and the actual data such that the model wavefield is iteratively corrected until calculated L0 and L1 norms are minimized. At L0 and L1 norm minimization, the model wavefield is believed to most accurately represent the actual wavefield that would have ascended from the geological subsurface if data could have been recorded at every possible location. Thus, at this point, the model wavefield or reconstructed wavefield may provide data from the entire surveyed area including all gaps between points and from any point or points within the survey area. Data from the reconstructed wavefield is then processed in the conventional manner to create a three dimensional image of the subsurface structures. With an accurately reconstructed wavefield, the shape of the geological interfaces can be more properly imaged. It should be recognized that wavefield reconstruction utilizes data from receivers well distant from gaps as the iterative process attempts to "fit" the model wavefield to the larger data set. Wavefield reconstruction algorithms model the wavefield based upon its components and the physical properties of the survey area being sampled. In the present invention, prior knowledge of the geological substructures in the design of the receiver array and especially the non-uniform spacing of the receiver array enhances and enlarges the strength of such algorithms to obtain a more accurate reconstructed wavefield with the same number or fewer data points. Wavefield reconstruction also takes advantage of the truism that the simplest model of the earth that accurately fits the measured data is likely the most correct model. Thus, by minimizing the L0 and L1 norms, the complexity of the geologic model that accurately matches the measured data is also minimized and provides a very useful reconstructed wavefield for imaging.

The wavefield reconstruction fidelity is dependent on the receiver spacings used in the sampling of the wavefield. It has been found that the wavefield sensed in the lateral dimension (perpendicular to the line of receivers) by the receivers can be better reconstructed if the receivers are spaced in a non-uniform or irregular spacing. The estimation can typically be quite accurate depending on the complexity of the geological interface. A flat interface is quite easy.

Consider the situation where someone desires to determine the contour of the bottom of a back yard pond where the water is dark and the person does not want to get wet. Since we know before hand that a pool normally has a generally flat or rounded bottom with some small variation in depth from one end to the other and that the deepest points will be away from the edges and somewhere centered within the pool, we can use this knowledge to take some short cuts. Using this knowledge, we can determine that a solution would be to take a yard stick and dip it into the pond at various places in the pond and develop a rough, but fairly accurate model of the bottom of the pond. This use of prior knowledge of the general type and nature of the pool allows us to model the problem and determine a method that would sample less densely and just a few profiles allow us to determine a very accurate representation of the pool bottom.

Next, let us consider what would happen if the pool is now a murky fishing pond. Now we can not make the assumption that the pool bottom is flat or smooth in fact more then likely the bottom is quite rough with rocks logs and other trash. If we look around the area on the surface we might conclude the bottom could have logs, brush or rocks. In this case, if the bottom is a very rough surface or unpredictable surface, the contour of the bottom is much more complicated and challenging to survey with few samples. Now a more densely sampled survey with more sampling profiles would be needed to accurately measure the subsurface. This kind of complication routinely occurs in seismic surveys.

The present invention uses some relatively simple logic to provide quality subsurface maps, models or images of geological interfaces, but creates such maps, models or images from data that can be acquired in a more efficient manner than current techniques using interpolation methods that are currently available. Returning to the backyard fishing pond example, the present invention would be practiced in a very small scale but analogous example where the surveyor would make several depth measurements fairly close together to determine how smooth or continuous the bottom is. The surveyor would then combine this knowledge with a review of the observations from the surface and determine the likelihood of debris and logs or rocks in the pond. If the bottom were to be smooth or flat, then the remainder of the measurements may be few and spread out. The depth between actual measurements may be confidently interpolated. For example, the depth at a point half way between two actual measurements two feet apart that are 16 inches and 18 inches may be confidently interpolated to be 17 inches. One need NOT make the actual measurement, especially if the time or cost to make such measurement is substantial. On the other hand, an efficient survey design could be developed that would provide a reasonably accurate model of a more complicated bottom structure, but the measurements would be closer together. The critical difference is between the concepts of interpolation and reconstruction. Interpolation is a mathematical process that does not use prior knowledge of what is being sampled to calculate the new value. In our example, most algorithms will come up with 17 inches regardless of the subsurface because that is the average of the two measurements. Interpolation takes no account of the prior knowledge of what is being sampled. This works with a pool bottom that is smoothly varying but if we consider a rough bottom of brush, rocks and logs, then we cannot confidently interpolate the answer. In this case we must reconstruct the bottom through using prior knowledge of the likeliness of the roughness on the bottom and proper sampling of the data we do sample.

Back to a seismic survey, applying the aforementioned concept becomes much more complicated for seismic data acquisition in that portions of the survey area may be simpler geological structures and other portions may have more complicated structures. Typically, a seismic data survey will survey an area where some data has already been collected, but the data is not sufficiently rich to resolve potential hydrocarbon deposits for drilling. This data from prior surveys maybe sparse 3D or 2D seismic data or even from well logs or other geological observations. Data from prior surveys may provide enough information to determine the complexity of the geological structures and create models of the substructures sufficient to analyze the "spacing" of actual data necessary to get a sufficiently accurate image of the geological substructures that are sufficient to justify the risk for spending millions of dollars on exploration wells. So, this invention is about getting sufficient volumes or density of seismic data to decide and plan a drilling program while minimizing the cost of gathering the seismic data.

Figure 2:
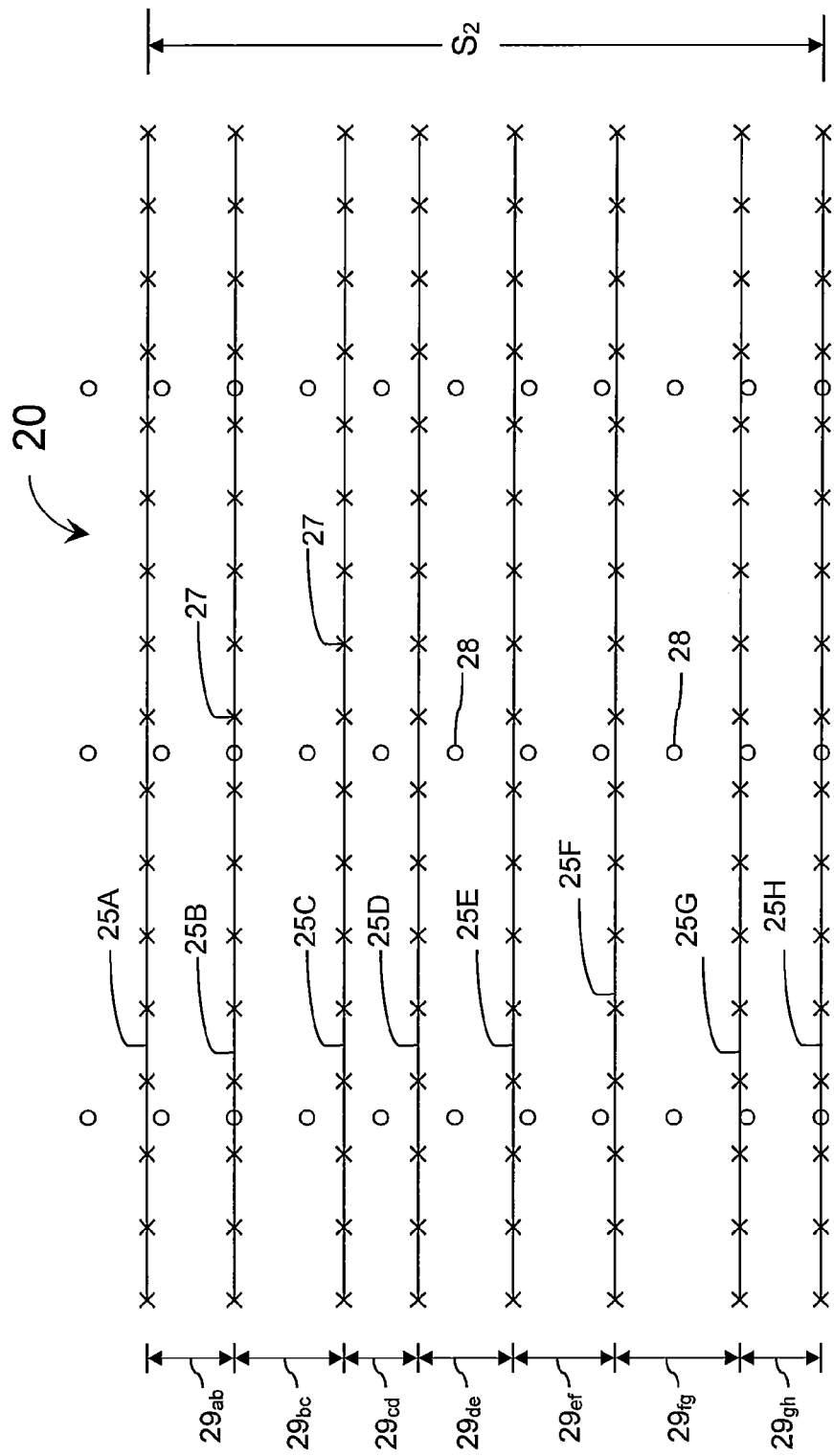
FIG. 2 is schematic top view of a portion of a seismic survey area showing one inventive arrangement of lines of seismic receivers with shot points.

Referring now to FIG. 2, a seismic data acquisition system is indicated by the arrow 20 where eight receiver lines comparable to the eight receiver lines of FIG. 1.

However, the receiver lines 25A, 25B, 25C, 25D, 25E, 25F, 25G and 25H are arranged to be spaced from one another by an uncommon or irregular spacing. Along each receiver line are a number of generally evenly spaced seismic receivers 27. As deployed for seismic data collection in FIG. 2, the total system width $S_2$, is wider than $S_1$. As with system 10 in FIG. 1, each pair of receiver lines have an individual receiver line spacing indicated as $29_{ab}$, $29_{bc}$, $29_{cd}$, $29_{de}$, $29_{ef}$, $29_{fg}$ and $29_{gh}$. While one or more receiver line spacings may be the same as other receiver line spacings, not all are the same. Preferably, at least one receiver line spacing 29 is equal to or less that the receiver line spacing 19 of the system 10 shown in FIG. 1. Specifically, spacing $29_{cd}$ is the same as spacing $19_{cd}$ while spacing $19_{ab}$ is slightly larger than spacing $19_{ab}$ and spacing $29_{bc}$ is quite a bit larger than spacing $19_{bc}$. At least one receiver line spacing must be less than or equal to or very close to equal to the receiver line spacing 19 of the System 10 in FIG. 1 in order to provide the accuracy of the data collected by inventive system 20. Since $S_2$ is wider than $S_1$, the area to be surveyed will be surveyed in less time at lower cost with an inventive system 20 configuration as compared to a conventional system 10 configuration as the survey area will be covered by fewer receiver lines overall. The range at which a configuration may be made wider without losing comparable accuracy depends on the complexity of the subsurface structures in the area to be surveyed. Based upon current studies, comparable accuracy may be obtained with $S_2$ being 10 to 20 percent wider and current estimates are that 35% wider provides data that is accurately processible. The same current analysis indicates that above 35% may create unacceptable holes in the data in certain complex substructures, but upwards of 50% and as high as 90% is possible and likely in fairly simple geologic structures and in seismically benign areas.

Figure 3:
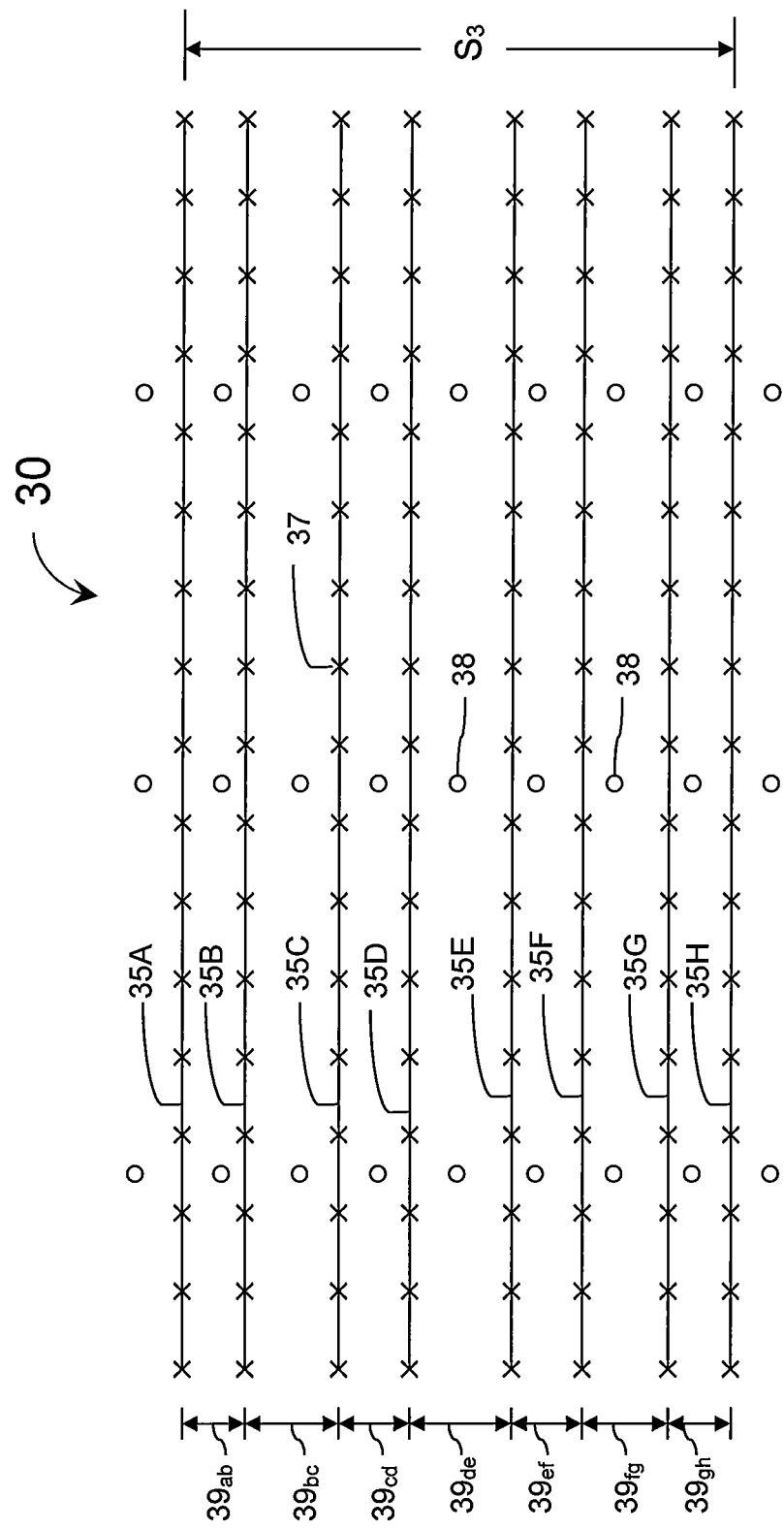
FIG. 3 is schematic top view of a portion of a seismic survey area showing a second inventive arrangement of lines of seismic receivers with shot points.

Turning now to FIG. 3, the inventive technique of the present invention may be used to another and perhaps opposite end. The first end was to create an accurate model of the geological substructures with a sparser array of receiver lines. The opposite end is to provide a much more precise model of the geological substructures without giving up productivity. In FIG. 3, a system 30 is shown where eight receiver lines comparable to the eight receiver lines of FIG. 1 and of FIG. 2. Like system 20, the receiver lines 35A, 35B, 35C, 35D, 35E, 35F, 35G and 35H are arranged to be spaced from one another and by an uncommon or irregular spacing. However, the lateral width $S_3$ of system 30 is approximately the same as $S_1$, the width of conventional system 10. Along each receiver line is a number of generally evenly spaced seismic receivers 37. Like in System 10 in FIG. 1, each pair of receiver lines have an individual receiver line spacing indicated as $39_{ab}$, $39_{bc}$, $39_{cd}$, $39_{de}$, $39_{ef}$, $39_{fg}$ and $39_{gh}$. While on line spacings may be the same as other receiver line spacings, not all are the same. Preferably, at least one receiver line spacing 39 is less that the receiver line spacing 19 of system 10 shown in FIG. 1 while one or more receiver line spacings 39 are larger than the common receiver line spacing 19. However, since $S_3$ is essentially the same as $S_1$, the area to be surveyed will take about the same number of receiver lines and about the same amount of time with the inventive system 30 configuration as compared to the conventional system 10 configuration. What is key is that having one or two or three receiver line spacings 39 being less than the common receiver line spacing 19 provides greater wavefield reconstruction accuracy. The closely spaced receiver line spacings $39_{ab}$ and $39_{ef}$ provide accurate data and provide details for the wavefield reconstruction algorithms and processors to more accurately estimate the shape of the geological interfaces in the larger gaps represented by spacings $39_{bc}$ and $39_{de}$. System 30 essentially provides higher detail without higher cost.

Figure 4:
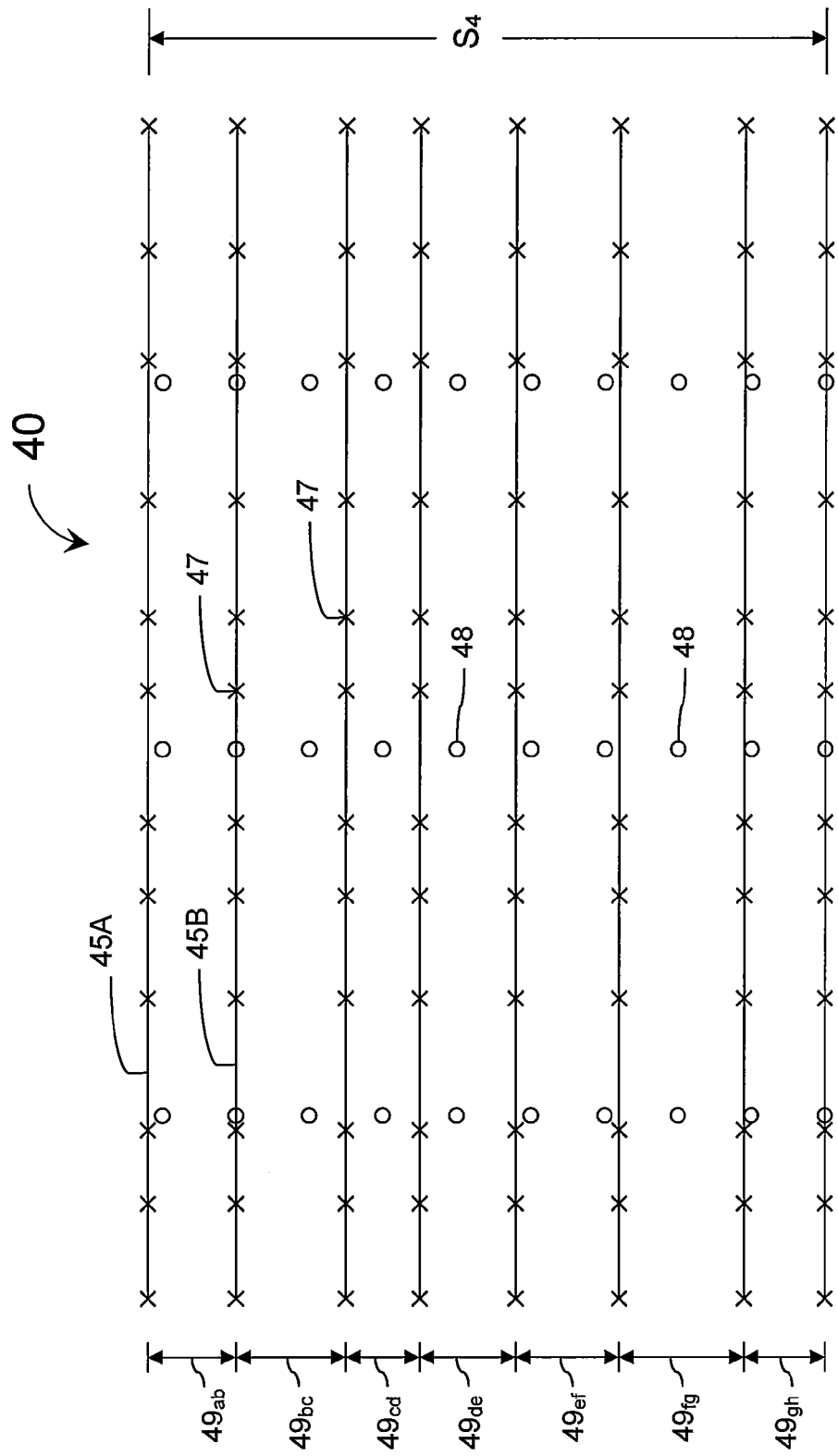
FIG. 4 is schematic top view of a portion of a seismic survey area showing a third alternative inventive arrangement of lines of seismic receivers with shot points.
Figure 5:
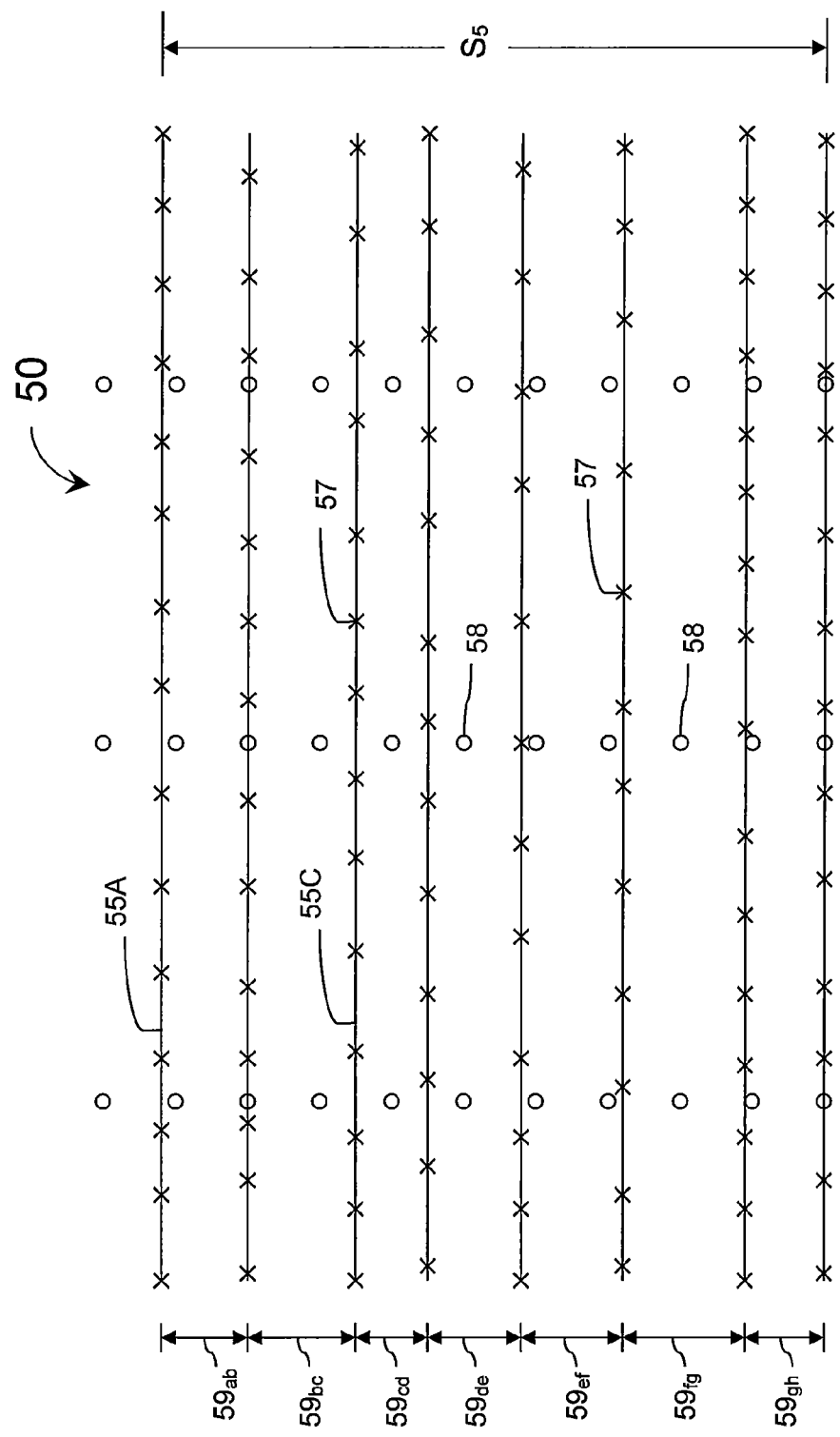
FIG. 5 is schematic top view of a portion of a seismic survey area showing a fourth alternative inventive arrangement of lines of seismic receivers with shot points.

In other more preferred embodiments, the receivers themselves do not have to be equally spaced along the receiver lines. As shown in FIGS. 4 and 5, the receiver lines are unequally spaced in the same manner and spacing as system 20 in FIG. 2. In FIG. 4, the system 40 the spacing of the receivers along a receiver line is shown to be non-uniform. It should be seen that all of the receiver lines have the same common, but unequal spacing. Thus, the receivers are all in common lines or straight columns from top to bottom of the drawing. In FIG. 5, the system 50 has the same non-uniform receiver line spacing as system 20 in FIG. 2, but the spacing of the receivers along the receiver line is not only non-uniform, but not the same from receiver line to receiver line. In other words, the receivers do not line up in straight columns.

Figure 6:
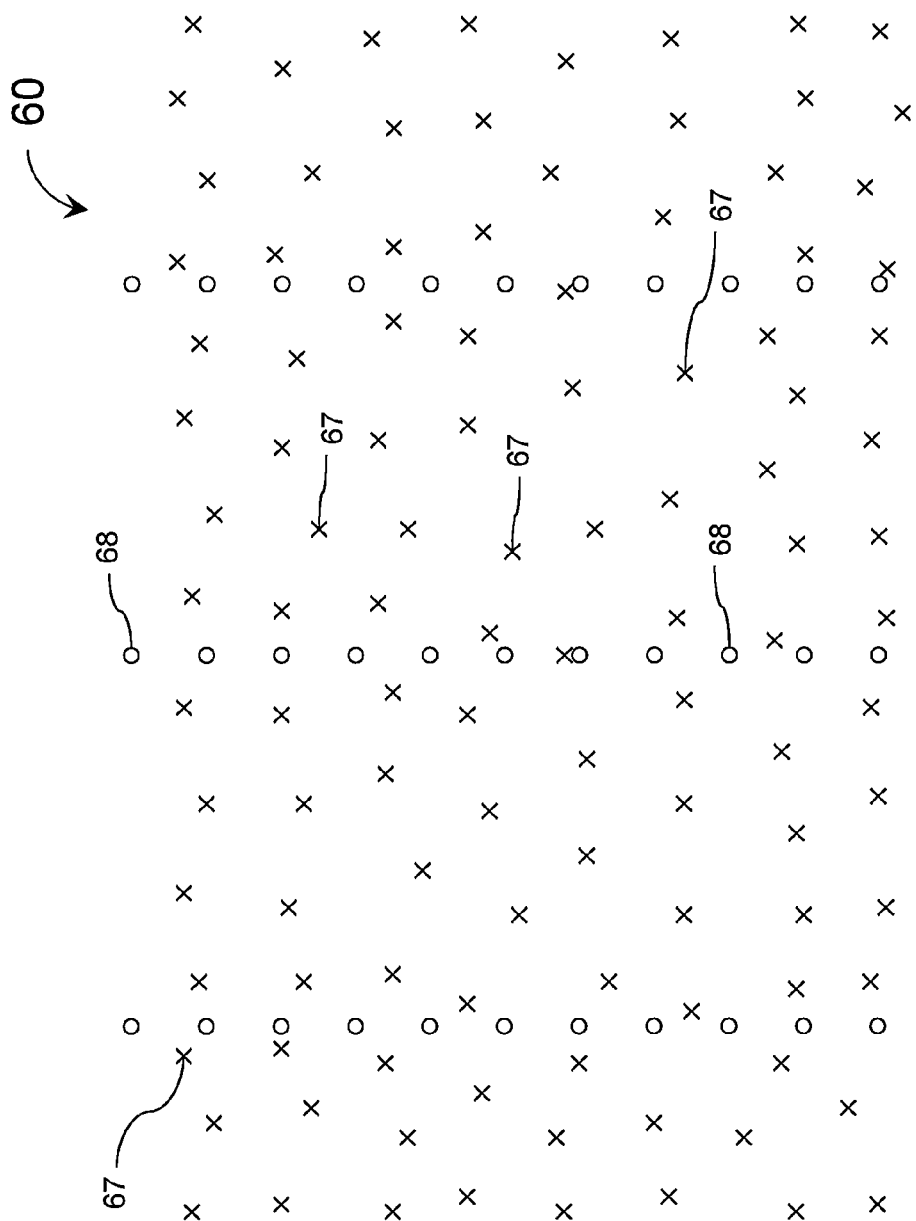
FIG. 6 is schematic top view of a portion of a seismic survey area showing a fifth alternative inventive arrangement of lines of seismic receivers with variably spaced shotpoints.
Figure 7:
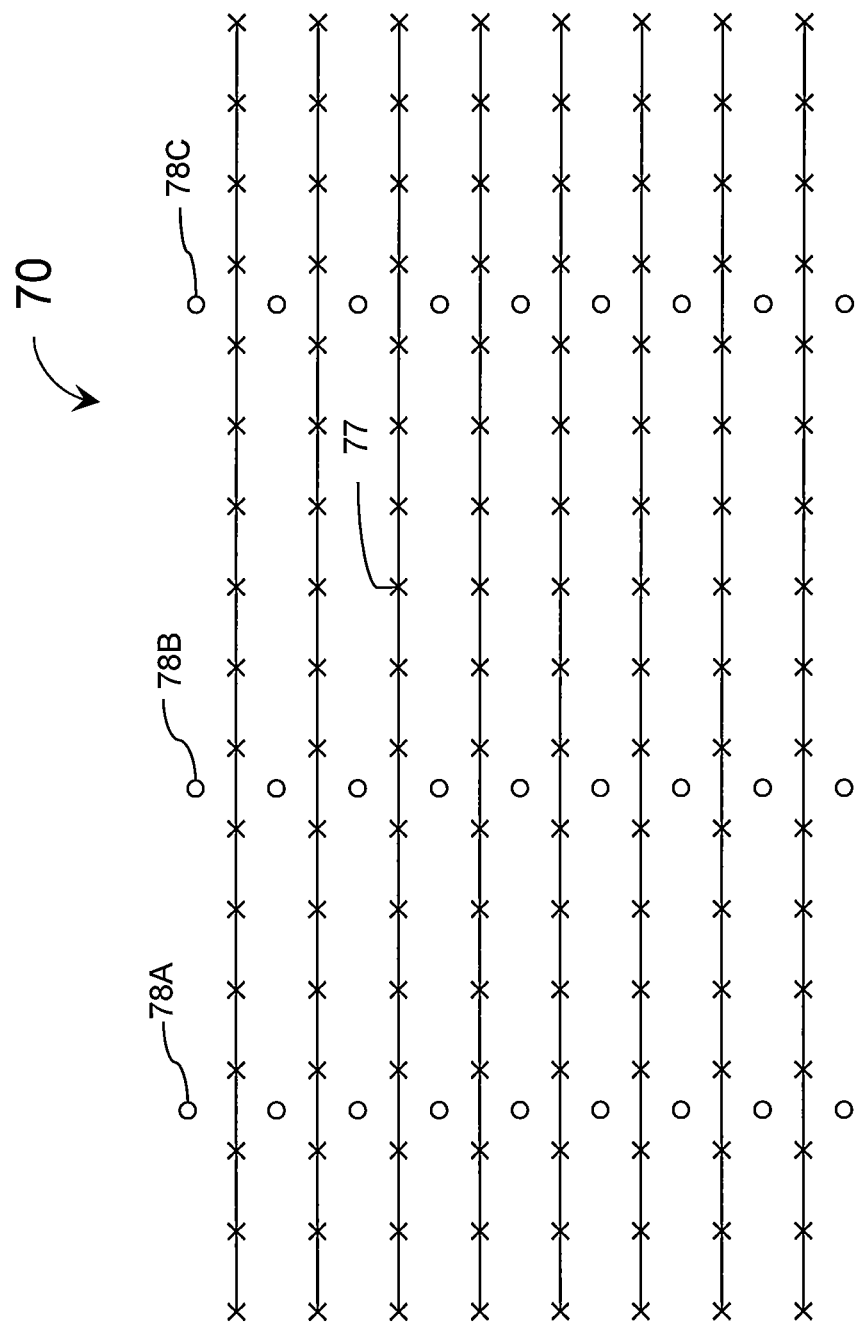
FIG. 7 is a is schematic top view of a portion of a seismic survey area showing a sixth alternative inventive arrangement of lines of seismic receivers with shot points.

In FIG. 6, the system 60 does not include alignment in any direction and are two dimensionally non-uniform. It should be noted that the sources through all of the embodiments from system 20 to system 60 include sources that have been maintained in common regular spacing. Referring to FIG. 7, the system 70 at first appears to be exactly the same as system 20. All of the receivers are aligned and ordered in the same common spacing. However, a closer inspection reveals that the center column of sources are closer to the left column and further from the right column. Essentially, system 70 shows that the sources may also be arranged in the non-uniform arrangements of the receivers.

Figure 8:
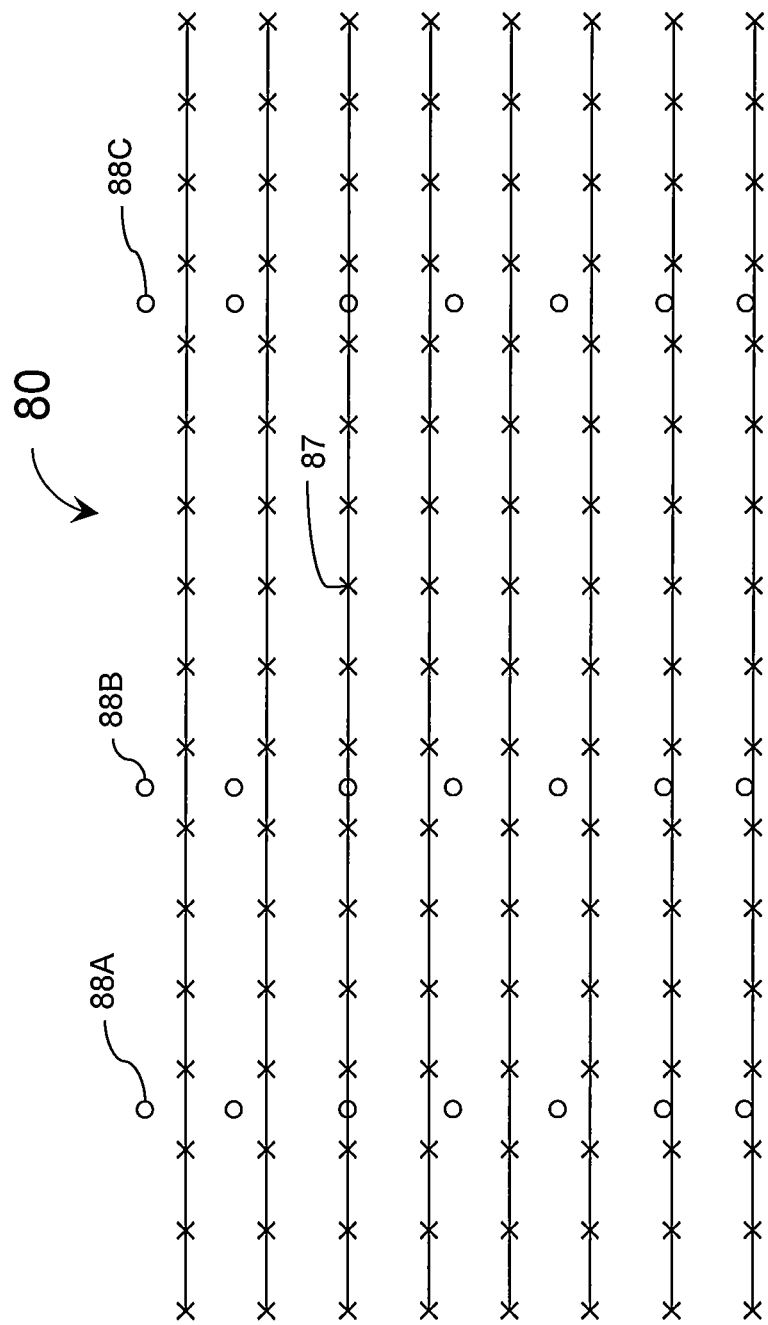
FIG. 8 is schematic top view of a portion of a seismic survey area showing a seventh alternative inventive arrangement of lines of seismic receivers with shot points.

Referring to FIG. 8, the next level of complication of source spacing is demonstrated by system 80 which includes varied spacing vertically, but all columns have the same non-uniform spacing.

Figure 9:
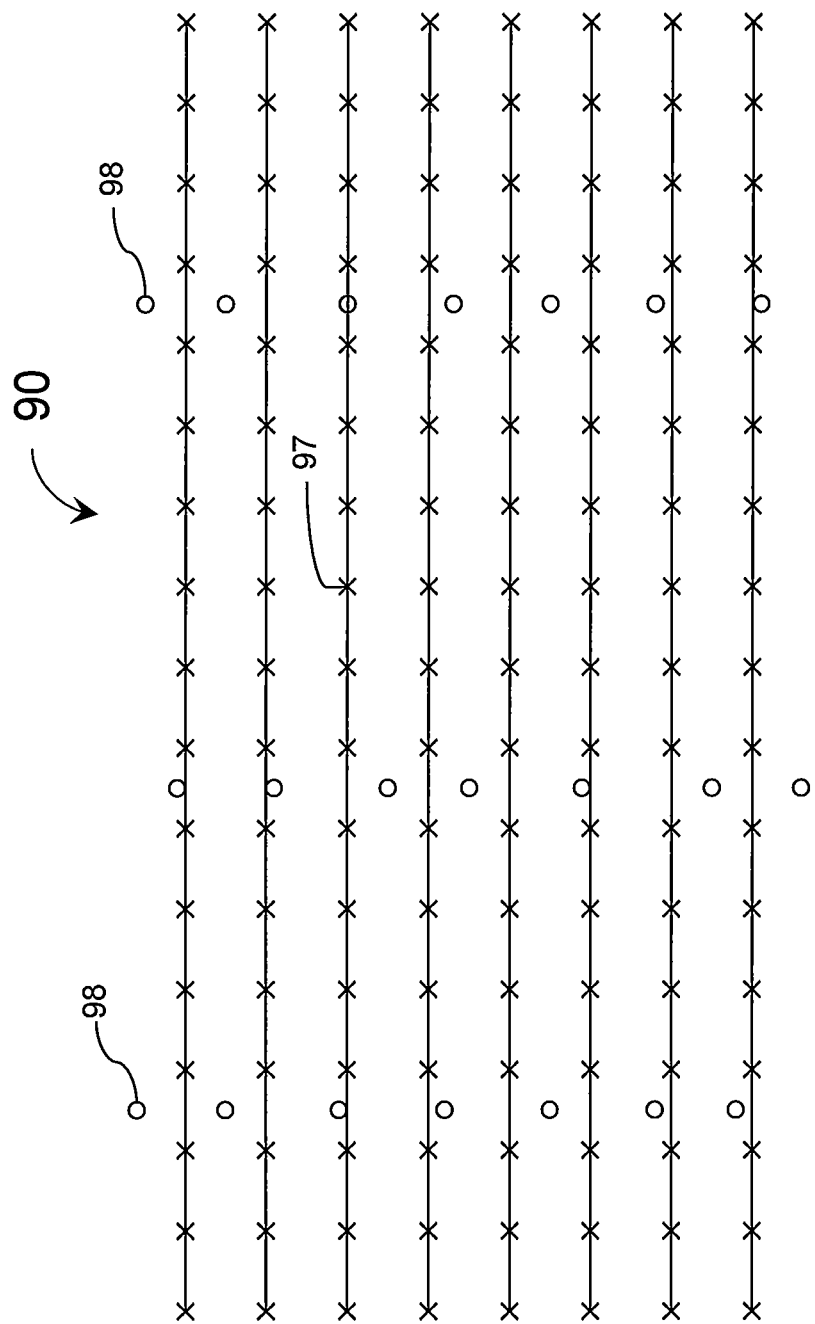
FIG. 9 is schematic top view of a portion of a seismic survey area showing a eighth alternative inventive arrangement of lines of seismic receivers with shot points.

Referring to FIG. 9, system 90 shows a slightly more complicated arrangement for the sources where they remain in straight columns, but the columns are non-uniformly spaced, the spacing vertically within the columns is no-uniform and each column is differently non-uniformly spaced.

Figure 10:
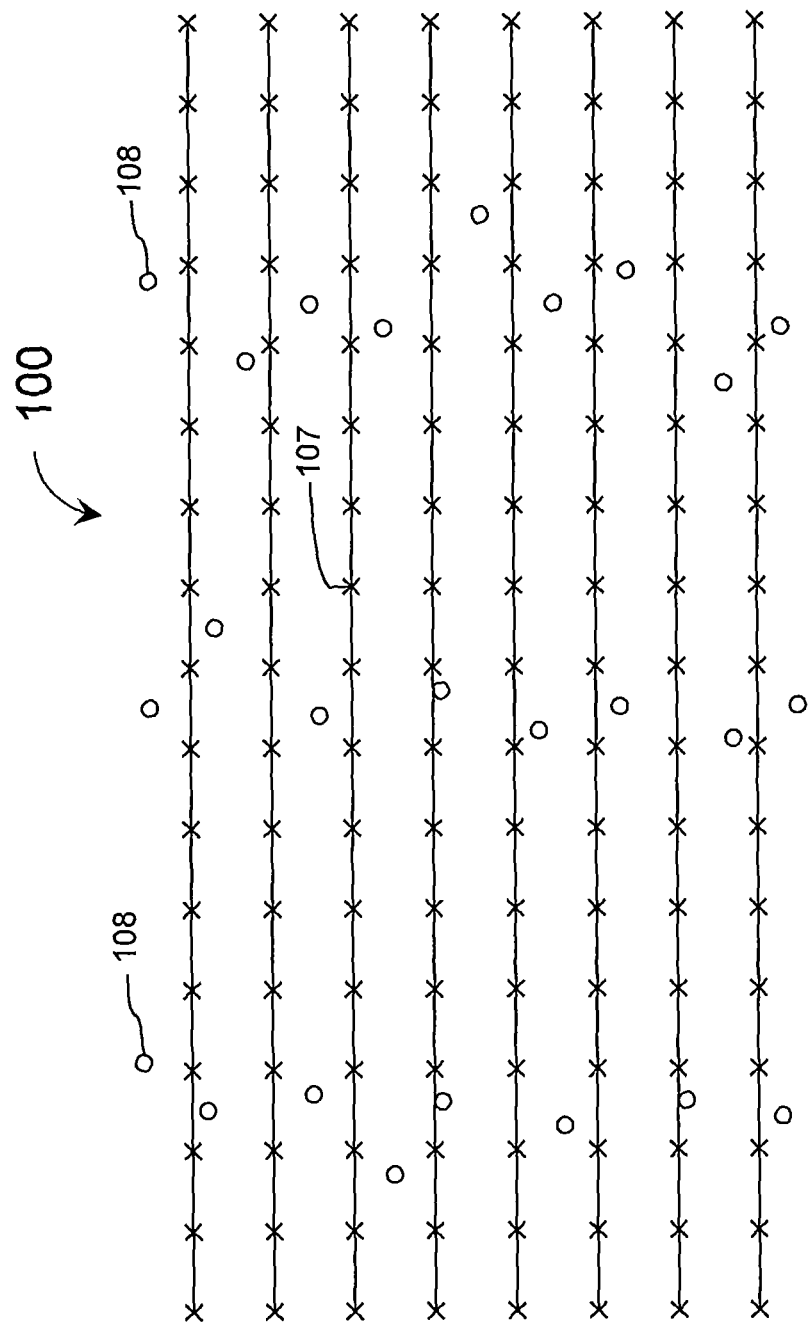
FIG. 10 is schematic top view of a portion of a seismic survey area showing a ninth alternative inventive arrangement of lines of seismic receivers with shot points.

System 100 in FIG. 10 shows an additional bit of complexity where the sources are fully varied in both vertically and horizontally in the Figure, but on the ground in both the x and y directions.

Figure 11:
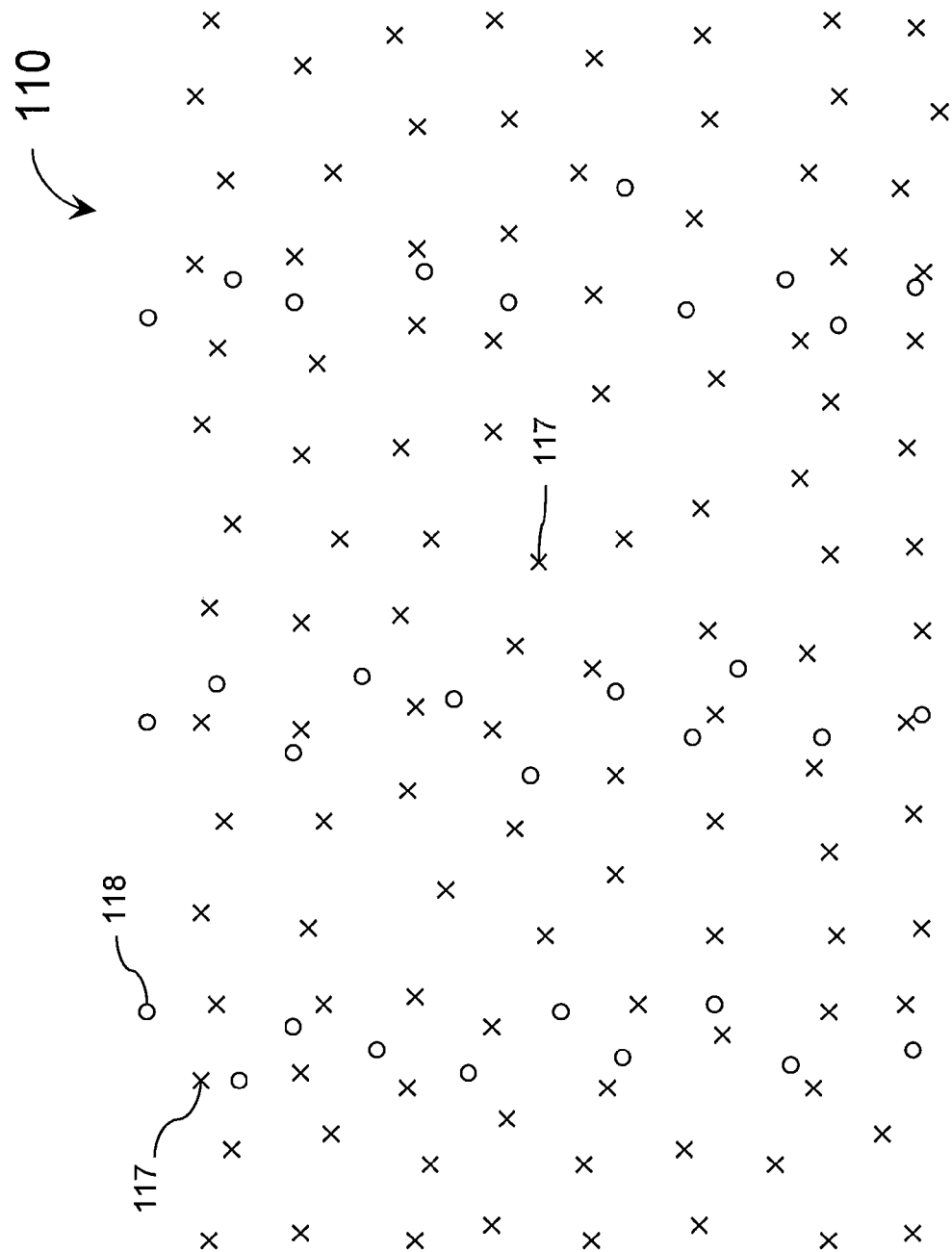
FIG. 11 is schematic top view of a portion of a seismic survey area showing a tenth alternative inventive arrangement of lines of seismic receivers with shot points.

What should be recognized in systems 70 through 100 is that the receivers have all be uniform in both directions. Many combinations of non-uniform spacings for both the sources and receivers are possible. The permutations of a few combinations of spacings for both sources and receivers have been described above. The most complicated combination is shown in FIG. 11 where system 110 includes the sources have full two dimensional non-uniformity and the receivers being fully non-uniform in two dimensions. The following table suggests that more combinations are possible and is presented to avoid presenting many extra drawings that are unnecessary to the understanding of the present invention:

| FIG. | Source | Receiver |
|---|---|---|
| Prior Art FIG. 1 | Uniform | Uniform |
| FIG. 2-wider | Uniform | Non-Uniform LINES with uniform spacing along lines |

-continued

| FIG. | Source | Receiver |
|---|---|---|
| FIG. 3-high definition | Uniform | Non-Uniform LINES with uniform spacing along lines |
| FIG. 4 | Uniform | Non-Uniform LINES with REGULAR Non-Uniform spacing along lines |
| FIG. 5 | Uniform | Non-Uniform LINES with Irregular Non-Uniform spacing along lines |
| FIG. 6 | Uniform | Non-Uniform in 2D |
| FIG. 7 | Non-Uniform LINES with uniform spacing along lines | Uniform |
|  | Non-Uniform LINES with uniform spacing along lines | Non-Uniform LINES with uniform spacing along lines |
|  | Non-Uniform LINES with uniform spacing along lines | Non-Uniform LINES with REGULAR Non-Uniform spacing along lines |
|  | Non-Uniform LINES with uniform spacing along lines | Non-Uniform LINES with Irregular Non-Uniform spacing along lines |
|  | Non-Uniform LINES with uniform spacing along lines | Non-Uniform in 2D |
| FIG. 8 | Non-Uniform LINES with REGULAR Non-Uniform spacing along lines | Uniform |
|  | Non-Uniform LINES with REGULAR Non-Uniform spacing along lines | Non-Uniform LINES with uniform spacing along lines |
|  | Non-Uniform LINES with REGULAR Non-Uniform spacing along lines | Non-Uniform LINES with REGULAR Non-Uniform spacing along lines |
|  | Non-Uniform LINES with REGULAR Non-Uniform spacing along lines | Non-Uniform LINES with IRRegular Non-Uniform spacing along lines |
|  | Non-Uniform LINES with REGULAR Non-Uniform spacing along lines | Non-Uniform in 2D |
| FIG. 9 | Non-Uniform LINES with Irregular Non-Uniform spacing along lines | Uniform |
|  | Non-Uniform LINES with Irregular Non-Uniform spacing along lines | Non-Uniform LINES with uniform spacing along lines |
|  | Non-Uniform LINES with Irregular Non-Uniform spacing along lines | Non-Uniform LINES with REGULAR Non-Uniform spacing along lines |
|  | Non-Uniform LINES with Irregular Non-Uniform spacing along lines | Non-Uniform LINES with Irregular Non-Uniform spacing along lines |
|  | Non-Uniform LINES with Irregular Non-Uniform spacing along lines | Non-Uniform in 2D |
| FIG. 10 | Non-Uniform in 2D | Uniform |
|  | Non-Uniform in 2D | Non-Uniform LINES with uniform spacing along lines |
|  | Non-Uniform in 2D | Non-Uniform LINES with REGULAR Non-Uniform spacing along lines |
|  | Non-Uniform in 2D | Non-Uniform LINES with Irregular Non-Uniform spacing along lines |
| FIG. 11 | Non-Uniform in 2D | Non-Uniform in 2D |

The ability to adequately reconstruct the wavefield will then depend on the design of the source and receiver spacings in both dimensions. Care must be taken in designing such a configuration so that the wavefield does not become under sampled for the subsurface objective being imaged. This can be modeled prior to acquisition of the survey to determine the required station and line spacing.

It should also be understood that receiver lines and source lines may still be implanted with varying degrees of freedom, but noting that there are no particular requirement that the orientation of the source line and receiver lines be orthogonal for the wavefield reconstruction to work. The lines may be oriented with variations in direction, patterns or layout. Some of the more common in the industry are the brick, zig-zag, slash and inline survey designs. Non-uniform line and station spacing for wavefield reconstruction work equally well with each of these survey technique.

Finally, the scope of protection for this invention is not limited by the description set out above, but is only limited by the claims which follow. That scope of the invention is intended to include all equivalents of the subject matter of the claims. Each and every claim is incorporated into the specification as an embodiment of the present invention. Thus, the claims are part of the description and are a further description and are in addition to the preferred embodiments of the present invention. The discussion of any reference is not an admission that it is prior art to the present invention, especially any reference that may have a publication date after the priority date of this application.

The invention claimed is:

1. A method of acquiring seismic data comprising the steps of:
    a. deploying receivers in a survey area wherein each receiver is laterally spaced from one another in two horizontal directions wherein the lateral spacing in at least one horizontal direction is deliberately non-uniform, wherein the receivers are not aligned in at least one of the two horizontal directions and wherein the spacing between any two seismic receivers in the deliberately non-uniform direction varies by a distance of at least five percent between the largest spacing and smallest spacing;
    b. identifying seismic source points within the survey area;
    c. directing seismic energy into the ground at the source points and recording reflected and/or refracted seismic data with the deployed seismic receivers;
    d. recovering the measured data from the deployed seismic receivers; and
    e. reconstructing the wavefield from the recovered data.

2. The method according to claim 1, wherein the receivers are spaced in a deliberately non-uniform spacing in both horizontal directions where the largest spacing is at least five percent larger than the smallest spacing in at least one direction.

3. The method according to claim 1, wherein at least twenty percent of the deployed receivers are spaced more than ten percent further apart in the non-uniform spacing direction than the smallest spacing between receivers in the non-uniform direction.

4. The method according to claim 1, wherein at least fifty percent of the deployed receivers are spaced more than fifteen percent further apart in the non-uniform spacing direction than the smallest spacing between receivers in the non-uniform direction.

5. The method according to claim 1, wherein at least fifty percent of the deployed receivers are spaced more than twenty percent further apart in the non-uniform spacing direction than the smallest spacing between receivers in the non-uniform direction.

6. The method according to claim 1, wherein at least fifty percent of the deployed receivers are spaced more than twenty five percent further apart in the non-uniform spacing direction than the smallest spacing between receivers in the non-uniform direction.

7. The method according to claim 1, wherein at least seventy percent of the deployed receivers are spaced more than fifteen percent further apart in the non-uniform spacing direction than the smallest spacing between receivers in the non-uniform direction.

8. The method according to claim 1, wherein at least seventy percent of the deployed receivers are spaced more than twenty percent further apart in the non-uniform spacing direction than the smallest spacing between receivers in the non-uniform direction.

9. The method according to claim 1, wherein at least fifty percent of the deployed receivers are spaced more than thirty percent further apart in the non-uniform spacing direction than the smallest spacing between receivers in the non-uniform direction.

10. A method of acquiring seismic data comprising the steps of:
  a. deploying receivers in a survey area and identifying seismic source points within the survey area where each source point is laterally spaced from one another in two horizontal directions wherein the lateral spacing in at least one horizontal direction is deliberately non-uniform, wherein the receivers are not aligned in at least one of the two horizontal directions and wherein the spacing between any two seismic source points in the deliberately non-uniform direction varies by a distance of at least five percent between the largest spacing and smallest spacing;
  b. directing seismic energy into the ground at the source points and recording reflected and/or refracted seismic data with the deployed seismic receivers;
  c. recovering the measured data from the deployed seismic receivers; and
  d. reconstructing the wavefield from the recovered data.

11. The method according to claim 10, wherein the sources are spaced in a deliberately non-uniform spacing in both horizontal directions where the largest spacing is at least five percent larger than the smallest spacing in at least one direction.

12. The method according to claim 10, wherein at least twenty percent of the deployed sources are spaced more than ten percent further apart in the non-uniform spacing direction than the smallest spacing between sources in the non-uniform direction.

13. The method according to claim 10, wherein at least fifty percent of the deployed sources are spaced more than thirty percent further apart in the non-uniform spacing direction than the smallest spacing between receivers in the non-uniform direction.

14. A method of acquiring seismic data comprising the steps of:
  a. deploying receivers in a survey area where each receiver is laterally spaced from one another in two horizontal directions and identifying source points wherein each source point is laterally spaced from one another wherein the lateral spacing for each of the source points and for each of the receivers is deliberately non-uniform in at least one horizontal direction, wherein the receivers are not aligned in at least one of the two horizontal directions and wherein the horizontal spacing between any two seismic receivers in the deliberately non-uniform direction varies by a distance of at least five percent between the largest spacing and smallest spacing and further wherein the horizontal spacing between any two seismic source points in the deliberately non-uniform direction varies by a distance of at least five percent between the largest spacing and smallest spacing;
  b. directing seismic energy into the ground from the source points and recording reflected and/or refracted seismic data with the deployed seismic receivers;
  c. recovering the measured data from the deployed seismic receivers; and
  d. reconstructing the wavefield from the recovered data.

15. The method according to claim 14, wherein the spacing for adjacent receivers and the spacing for adjacent source points are spaced in a deliberately non-uniform spacing in both horizontal directions where the largest spacing for the receivers and the largest spacing for the source points is at least fifty percent larger than the smallest spacing for each.

16. The method according to claim 14, wherein at least fifty percent of the deployed receivers and fifty percent of the source points are spaced more than fifteen percent further apart in the non-uniform spacing direction than the smallest spacing between receivers and sources in the non-uniform direction.

17. The method according to claim 14, wherein at least seventy percent of the deployed receivers and seventy percent of the source points are spaced more than twenty-five percent further apart from the next adjacent receiver or source point, respectively.

* * * * *

(12) INTER PARTES REVIEW CERTIFICATE (2793rd)

United States Patent
Eick et al.

(10) Number: US 9,846,248 K1
(45) Certificate Issued: Aug. 8, 2022

(54) SEISMIC DATA ACQUISITION USING DESIGNED NON-UNIFORM RECEIVER SPACING

(75) Inventors: Peter M. Eick; Joel D. Brewer

(73) Assignee: CONOCOPHILLIPS COMPANY

Trial Number:

IPR2019-00850 filed Mar. 20, 2019

Inter Partes Review Certificate for:

Patent No.: 9,846,248
Issued: Dec. 19, 2017
Appl. No.: 13/156,104
Filed: Jun. 8, 2011

The results of IPR2019-00850 are reflected in this inter partes review certificate under 35 U.S.C. 318(b).

INTER PARTES REVIEW CERTIFICATE
U.S. Patent 9,846,248 K1
Trial No. IPR2019-00850
Certificate Issued Aug. 8, 2022

AS A RESULT OF THE INTER PARTES REVIEW PROCEEDING, IT HAS BEEN DETERMINED THAT:

Claims 10-17 are found patentable.

Claims 1-9 are cancelled.

\* \* \* \* \*